United States Patent [19]

Narrin

[11] Patent Number: 5,613,305
[45] Date of Patent: Mar. 25, 1997

[54] DEVICE FOR PROVIDING ELEVATED AND UNIVERSALLY ADJUSTABLE SUPPORT OF A HAIR DRYER

[76] Inventor: Nancy Narrin, 4450 Middle Channel Dr., Harsens Island, Mich. 48028

[21] Appl. No.: 594,647

[22] Filed: Feb. 2, 1996

[51] Int. Cl.⁶ ........................................ F26B 19/00
[52] U.S. Cl. ........................... 34/90; 34/91; 34/97
[58] Field of Search .................... 34/90, 91, 96, 34/97; 248/284.1, 288.31, 314, 315, 311.2, 316.5

[56] References Cited

U.S. PATENT DOCUMENTS

| | | | |
|---|---|---|---|
| 260,912 | 7/1882 | Tibbals | 248/316.5 |
| 499,933 | 6/1893 | Phillips | 248/316.5 |
| 823,162 | 6/1906 | Detrick | 248/284.1 |
| 1,074,648 | 10/1913 | Schwartzberg | 248/316.5 |
| 2,058,102 | 10/1936 | Phillip | 248/316.5 |
| 2,063,924 | 12/1936 | Hanko | 248/316.5 |
| 2,560,556 | 7/1951 | Creedon | 248/316.5 |
| 2,618,451 | 11/1952 | Campo | 248/316.5 |
| 3,398,919 | 8/1968 | Tokar | 248/316.5 |
| 4,461,439 | 7/1984 | Rose | 248/288.31 X |
| 4,635,382 | 1/1987 | Bourdeau | 34/97 |
| 4,712,313 | 12/1987 | Gettleman | 34/97 |
| 4,802,287 | 2/1989 | Chen | 34/91 |
| 5,181,328 | 1/1993 | Bouverie | 34/90 |
| 5,279,048 | 1/1994 | Lawall et al. | 34/97 |
| 5,313,716 | 5/1994 | Wolfe | 34/90 |
| 5,334,354 | 8/1994 | Johnston et al. | 248/316.5 |
| 5,386,644 | 2/1995 | Lawall et al. | 34/90 |

*Primary Examiner*—John M. Sollecito
*Assistant Examiner*—Steve Gravini
*Attorney, Agent, or Firm*—Gifford, Krass, Groh, Sprinkle, Patmore, Anderson & Citkowski, P.C.

[57] ABSTRACT

A device for providing elevated and universally adjustable support of a hair dryer, the hair dryer having a body with a handle portion and a heated air discharge portion. A receptacle member is provided for gripping the hair dryer by its handle portion and is positioned in the elevated and overhead fashion by an elongated support which is either supported by a floor base or is attached to a vertically extending wall. The receptacle member can take the form of either a pair of laterally displaceable pincer jaws for gripping the dryer handle or a modification of a pedestal and universal bail joint support for providing universally adjustable support to the hair dryer.

6 Claims, 2 Drawing Sheets

DEVICE FOR PROVIDING ELEVATED AND UNIVERSALLY ADJUSTABLE SUPPORT OF A HAIR DRYER

BACKGROUND OF THE INVENTION

1. Field of the Invention

The present invention relates generally to hair dryers and hair dryer support devices and, more particularly, to an improved device for providing elevated and universally adjustable support of a conventional hand held hair dryer, thus freeing the user's hands.

2. Description of the Prior Art

Hair dryers and other various types of hair drying devices are well known in the art. The purpose of such devices is invariably the same, to quickly and conveniently dry a user's hair after washing in a manner and style which is desirable to the user.

The earliest known type of hair drying devices is the overhead variety which is customarily found in beauty parlors. The advantages of these dryers include that they can be mounted in an elevated and overhead fashion above the user and that they provide a fairly strong current of heated air directly to the user's head. Among the drawbacks of such devices are their relatively high expense and large size which makes for difficult portability.

In recent years, portable hand held hair dryers have come into existence which are for the most part capable of generating the heated currents of air to dry the user's hair in the same fashion as provided by the earlier beauty parlor models. Due to their portable nature however, the more recent devices require the use of at least one of the user's hands during drying. This tends to be a detriment to those who prefer to have both hands remain free during drying in order to make full use of whatever hair care accessories are available, e.g., combs, brushes, sprays and the like.

U.S. Pat. No. 4,712,313, issued to Gettleman, teaches a hands free portable hair dryer holder which is designed to hold a portable hair dryer while in use, allowing a person to use two free hands on the hair. The holder is attached to an end of a table or wall mounted and spring tensioned extendable arm by an adjustable portion. A barrel portion of the hair dryer within which the currents of air are heated and distributed is gripped by a pair of C-shaped laws and the jaws are lined with foam inserts to securably affix the hair dryer.

It is readily apparent upon reviewing the Gettleman patent that its disclosure teaches a number of undesirable and potentially unsafe features. The most notable problem with Gettleman relates to the foam lined C-shaped jaws which grip therebetween the barrel portion of the hair dryer. As is well known, this part of the hair dryer will become extremely hot even after a short period of use. Due to the nature of its relatively simplified design, the extreme heat generated by a conventional hand held hair dryer is intended to be conducted to the atmosphere surrounding the barrel to prevent overheating of the device. Many of these devices also include automatic shut-off features to prevent overheating.

Having reviewed the Gettleman disclosure closely, it is evident that no accommodations have been made for dissipating the inevitable heat created within the barrel portion during use. As is well known, the heat resistant capabilities of foam materials is very poor and it is more than likely that, having been exposed by contact to the heated barrel for any duration of time, the foam would melt or possibly ignite into flames.

A further inherent shortcoming of the Gettleman holding device has to do with the spring tensioned arm which does not appear to include any fixing or locking means to anchor the dryer in a desired position. As is further well known, spring tensioned arms are very responsive to any type of applied force and will most likely fold inwardly in response to such a force application. As can be easily envisioned, the current of heated air discharged from a hair dryer as taught in Gettleman will create a rearwardly directed thrust which will most likely result in the dryer and holder being pushed backwards against the wall mount.

SUMMARY OF THE PRESENT INVENTION

The present invention is intended to be a dramatic improvement over Gettleman and teaches a device for providing elevated and universally adjustable support of a hand held hair dryer. The hair dryer is of a conventional and portable type and includes a body with a handle portion and a heated air discharge portion. An elongated support extends from a support surface and terminates in an elevated end portion. A receptacle member is secured to the elongated support end portion and releasably mounts the hair dryer by its handle portion so that the hair dryer is universally adjustable.

According to a first preferred embodiment, the receptacle member is constructed of first and second pincer jaw portions which grip the hair dryer handle therebetween. The interengaging surfaces of the jaw portions are formed with first and second semicircular receiving cavities which, when the jaws are engaged together, define first and second sized apertures for gripping a hair dryer handle of any size. Foam lining inserts or other like material are placed along the edges of the receiving cavities to provide cushioning support of the hair dryer.

According to another preferred embodiment, the receptacle member is a pedestal support having an appropriately configured interior cavity for receiving therein a universal ball which extends from a lower extremity of the dryer handle. According to yet another embodiment, the universal ball forms an upper part of the pedestal base and the lower extremity of the dryer handle is formed with the interior cavity for receiving therein the universal ball.

Notwithstanding which of the above preferred embodiments of the receptacle member is employed, the elongated support can be either an upwardly extending and telescoping tubular support which is mounted upon a floor base or a wall mounted and extendable arm having first and second pivotally connected members. Regardless of whether the telescoping tubular members or the pivotally connected members of the elongated support is utilized, a loosening and retightening assembly is also provided to prevent inadvertent and unwanted movement of the elongated support resulting from the thrust generated by the hair dryer.

BRIEF DESCRIPTION OF THE DRAWINGS

Reference will now be made to the attached drawings, when read in combination with the following specification, wherein like reference numerals refer to like parts throughout the several views, and in which.

DESCRIPTION OF THE PREFERRED EMBODIMENTS

Figure 1:
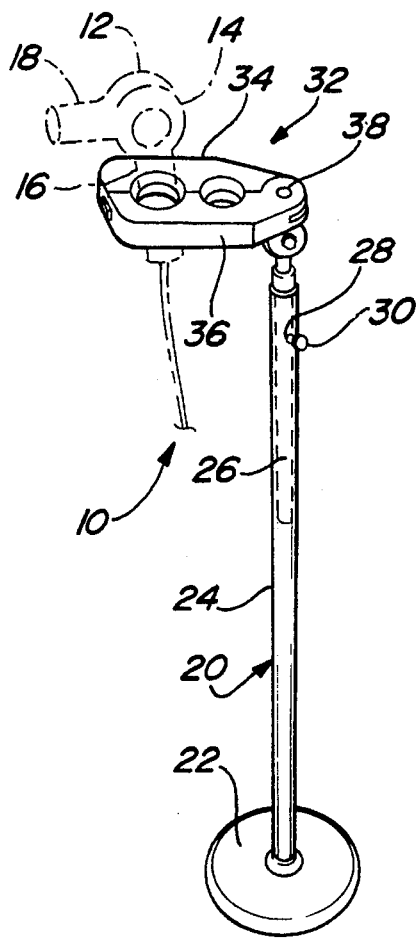
FIG. 1 is a perspective view of the elevated and universally adjustable hair dryer support according to a first preferred embodiment of the present invention.

Referring to FIG. 1, a device 10 is shown for providing elevated and universally adjustable support of a conventional and portable hair dryer 12 according to the present invention. The hair dryer 12 is typically of the hand held variety and includes a body 14 with a downwardly extending handle portion 16 and a forwardly directed heated air discharge portion 18.

An elongated support 20 is provided and extends upwardly from a floor base 22 which supports the device 10 upon a ground surface. The elongated support 20 may be formed as a single rigid piece but preferably includes first 24 and second 26 upwardly and telescoping members. The second member 26 is preferably slidably mounted within the first member 24 which has a hollow interior for receiving the second member 26. A loosening and retightening means for selectively locking and unlocking the telescoping members is provided and includes an aperture 28 formed in the first member 24 at a point overlapping the second member 26. A threaded nut 30 may be provided and the aperture 28 is likewise threaded to receive the nut so that it is selectively rotatable in one of two positions to either loosen or retighten the connection between the members 24 and 26. In this fashion the nut 30 may be loosened to adjust the displacement between the tubular members and therefore the height of the elongated support and then retightened to secure the desired height in place.

Figure 2:
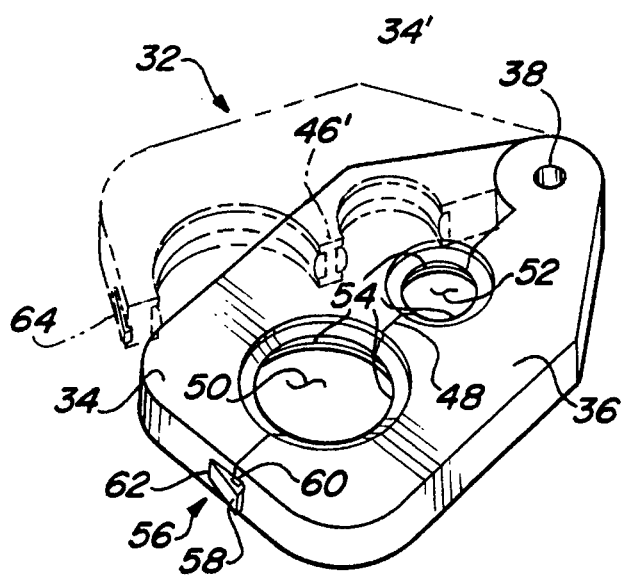
FIG. 2 is a partial view of the receptacle member according to the first preferred embodiment and indicating in phantom the actuation of the laterally displaceable pincer jaw portions.
Figure 3:
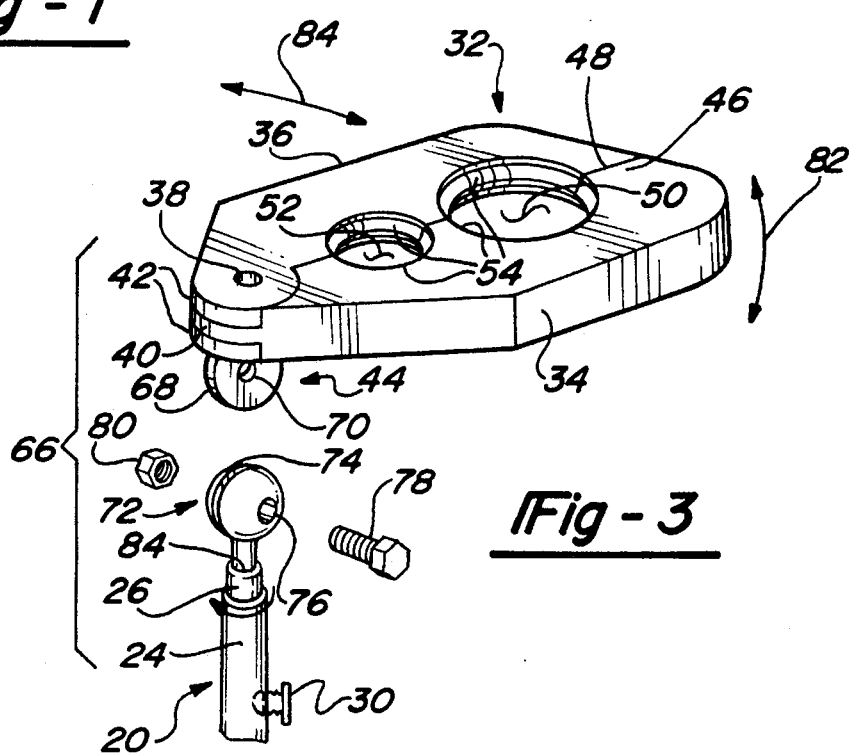
FIG. 3 is a partially exploded view of the receptacle member according to FIG. 2 and illustrating the manner in which it attaches to a tubular support extending upwardly from a floor base.

Referring again to FIG. 1, and also to FIG. 2, a receptacle member 32 is shown according to the first preferred embodiment and includes a first pincer jaw portion 34 and a second pincer jaw portion 36 which are hingedly connected together at a pivot connection 38. The pincer jaw portions 34 and 36 are each constructed of planar shaped members with substantially flat surfaces and rounded corners. As is best shown in FIG. 3, the pivot connection is provided by the first pincer jaw 34 having a first connecting portion 40 and the second pincer jaw 36 having a pair of spaced apart second connecting portions 42 which sandwich therebetween the first connecting portion 40. The pivot connection 38 is defined by a channel which extends through the first and second connecting portions 34 and 36 and a pin member 44 is inserted into the channel to pivotally engage the connecting portions.

Referring again to FIGS. 2 and 3, the first pincer jaw 34 has a first interengaging surface 46 and the second pincer jaw 36 a second interengaging surface 48. The first interengaging surface 46 is defined by first and second semicircular receiving cavities and the second interengaging surface 48 is likewise defined by first and second semicircular receiving cavities such that, when the pincer jaw portions are rotated together, they create a first 50 and a second 52 circular receiving aperture each of different size for gripping an appropriately configured handle portion 16 of a hair dryer 12.

In order to create a secure fit between the pincer jaws 34 and 36 and the hair dryer handle 16, a series of padded foam inserts 54 may further be placed along the edges of the respective semicircular receiving cavities such that, upon the pincer jaws being rotated to a closed position, the inserts 54 of the desired receiving aperture 50 or 52 encircle and grip the handle 16 of the hair dryer. The apertures 50 and 52 are each of different dimensions to guarantee that one of them is appropriately sized for receiving the hair dryer handle 16 and to provide a snug fit around the handle.

Referring again to FIG. 2, a latch mechanism 56 is provided for securing the pincer jaws 34 and 36 in their closed position. The latch mechanism 56 includes an appropriately configured tab portion 58 which is hingedly mounted at 60 to an outer edge of the jaw 36 and which engages a corresponding surface of the jaw 34 when the jaws are rotated together. Although not shown in FIG. 2, the tab portion 58 may be spring loaded within its hinged mount 60 so that its tip 62 is biased inwardly. The jaw 34 is shown in phantom in a partially rotated open position, at 34', with an interengaging surface 46' which defines half of the receiving apertures 50 and 52. A tab receiving recess 64 is formed in the first pincer jaw 34 at a point where it is engaged by the end 62 of the tab portion 58 of the latch mechanism 56 and is locked in a sealing arrangement with the pincer jaw 36.

Referring again to FIG. 3, a universal securing means 66 attaches the receptacle member 32 atop the elongated support 20. As was previously described, the pin member 44 pivotally secures the jaw pincers 34 and 36 of the receptacle member together. The pin member terminates at a lower end in a flat disc shaped head 68 with a centrally formed aperture 70. Extending upwardly and integrally attached to the second telescoping member 26 of the elongated support 20 is a spherically shaped universal mount 72. A vertically extending recess 74 is formed through a central portion of the spherical mount 72 and is defined by oppositely facing inner walls within the sphere.

The disc shaped head 68 of the pin member 44 is inserted into the spherical mount 72 so that the aperture 70 aligns with a like aperture 76 formed through the mount 72. A bolt 78 is threadably engaged through the aligned apertures 70 and 76 and a hex head nut portion 80 attaches to an end of the bolt to securably mount the receptacle member 32 in place atop the elongated support. The bolt 78 and nut 80 can also be selectively loosened and retightened to adjust the position of the receptacle member 32 or can be left in a semi-tightened manner so that the rotational and angular positioning of the member 32 can be changed in a friction fit manner. Referring again to FIG. 3, the angular displacement of the receptacle member 32 is illustrated by arrow 82 and the rotational displacement of the member 32 about the elongated support 20 is illustrated by arrow 84.

The receptacle member 32 and elongated support 20 according to the first preferred embodiment is preferably constructed of a durable and lightweight metal or heavy duty aluminum and may also be constructed of any type of polymer or plastic exhibiting the necessary properties of durability and resilience. The vertical adjustability of the telescoping members 24 and 26 combined with the angular and rotational adjustment of the receptacle member 32 enables the mounted hair dryer to be adjusted and readjusted in a fashion desirable by the user.

Figure 4:
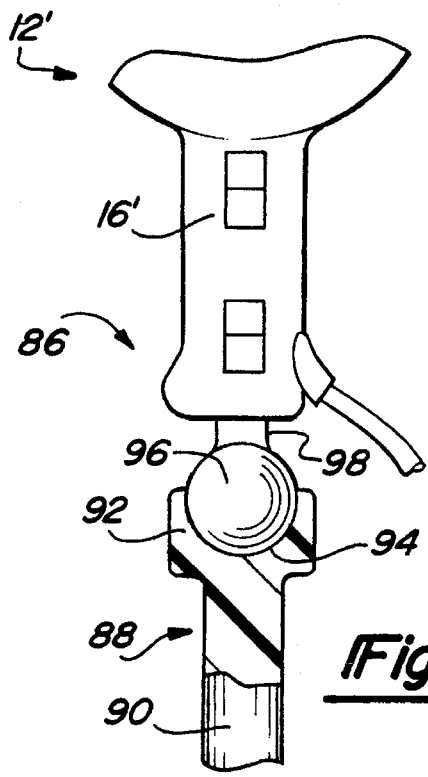
FIG. 4 is a sectional view, in partial cutaway, of a receptacle member according to a further preferred embodiment in which a universal ball is incorporated into a hair dryer handle and the receptacle member is formed as a pedestal with an interior ball receiving cavity.

Referring now to FIG. 4, a support device 86 according to another preferred embodiment is shown for mounting a modified handle portion 16' of a hair dryer 12'. The device 86 includes a receptacle member in the form of a pedestal support portion 88 which may form part of a vertically extending and floor supported elongated support as described in FIG. 1 or may be part of a wall mounted and extendable support arm as will be subsequently described. The pedestal support 88 includes a vertically extending neck portion 90 which terminates in an increased diameter portion 92. A substantially spherical cavity is formed in the top of the increased portion 92 and is defined by an arcuately curved line 94.

A spherical ball portion 96 extends downwardly from the handle portion 16' of the hair dryer and is connected to the hair dryer by a neck portion 98. The hair dryer 12' is preferably manufactured with the universal ball mount 96 in place but, alternatively, the mount 96 may be attached to a conventionally produced hair dryer by any other means which are known in the art. The walls of the increased portion 92 surrounding the spherical cavity are preferably somewhat elastic in nature such that they will deflect outwardly upon application of a predetermined amount of downward pressure to the spherical ball 96 in order to snappingly insert the ball 96 into the receiving cavity. The universal connection between the universal ball 96 extending from the hair dryer 12' and the receiving cavity of the pedestal support 88 is dimensioned such that enough of a friction fit is created to permit the hair dryer to be universally adjusted and to retain a given orientation for convenience of use.

Figure 5:
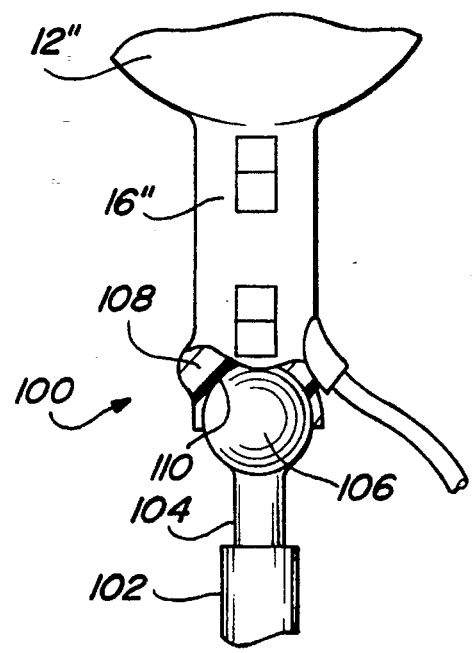
FIG. 5 is a sectional view, in partial cutaway, of a receptacle member according to yet a further preferred embodiment in which a universal ball is incorporated atop a pedestal base and the handle portion of the hair dryer is appropriately configured with an interior cavity to receive the ball.

Referring now to FIG. 5, a modification of the support device according to another preferred arrangement 100 is shown for mounting another modified handle portion 16" of a hair dryer 12". Another modification of the receptacle member is shown as a pedestal support having a first member 102 and a second member 104. The members 102 and 104 may be integrally formed as one piece or as is shown in the first preferred embodiment may be telescopically and adjustable connected. Attached to an uppermost end of the member 104 is a universal ball 106 which is very similar to the ball 96 shown in FIG. 4 with the exception here that it forms part of the pedestal mount rather than the hair dryer handle.

An open bottom portion 108 of the hair dryer handle 16" forms an open substantially spherical cavity which is defined by arcuately shaped wall 110 and which, similarly to the arrangement of FIG. 4, is snappingly engaged over the ball 106 in a force fit manner to universally mount the hair dryer 12" atop the pedestal mount.

Figure 6A:
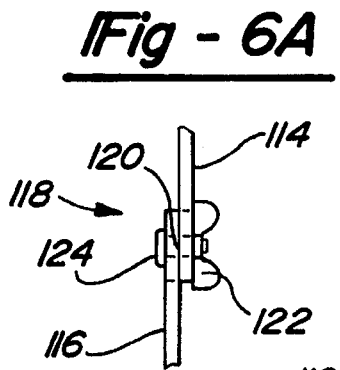
FIG. 6a is a cutaway view taken along line 6a—6a of FIG. 6 and showing the loosening and retightening means of the elongated wall mounted support according to the present invention.
Figure 6:
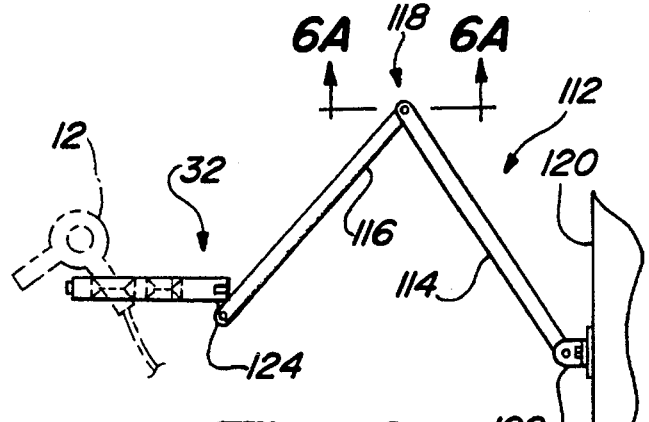
FIG. 6 is a side view of a first embodiment of the receptacle member mounted to an end portion of a pivoting arm wall mount according to the present invention.

Referring now to FIG. 6, the device with receptacle member 32 is shown attached to an end of an extendable wall mount assembly 112. The wall mount assembly 112 includes a first extendable member 114 and a second extendable member 116 which are pivotally connected at 118. The assembly 112 is mounted to a vertical wall surface 120 by a pivotal base connection 122 and the receptacle member 32 is mounted at the end of the second member 116 by a hinged connection 124. The horizontal and vertical positions of the hair dryer 12 may be adjusted by appropriately manipulating the extendable members 114 and 116 due to the selective locking means incorporated into the hinged connections 118, 122 and 124.

Specifically, referring to FIG. 6a, the intermediate hinged connection 118 is shown rotated in position and includes the adjoining portions of the members 114 and 116. A continuous channel 120 is formed through both the members 114 and 116 and receives a threaded bolt or hex head screw member 122. A nut portion 124 is threadably engaged to an end of the screw member 122 which projects from the opposite side of the members and is selectively loosened or tightened to allow for readjustment and retightening of the connection. The other hinged connections 122 and 124 can likewise include screw fasteners or each of the connections can be formed in a semi-friction fit manner which is sufficient in strength to support the hair dryer in an elevated and semi-fixed extending fashion at the end of the extendable assembly 112 while still allowing for the various horizontal and vertical adjustments.

Figure 7:
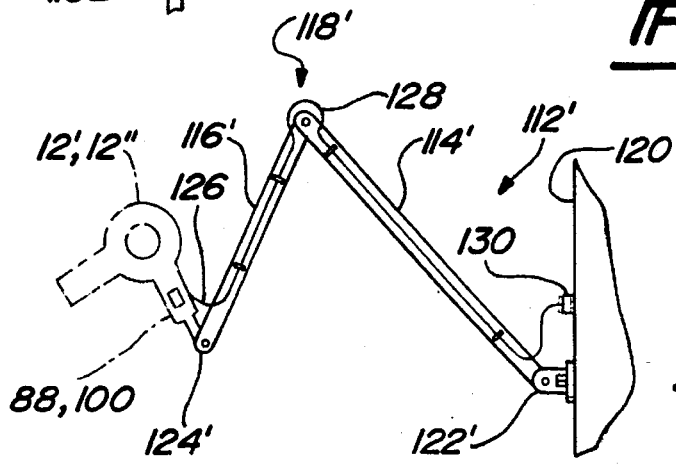
FIG. 7 is a view similar to that shown in FIG. 6 and illustrating a further preferred embodiment of the receptacle member secured to an end portion of a wall mounted extendable arm according to the present invention.

FIG. 7 is similar to FIG. 6 and shows a like wall mounted and extendable assembly 112' for securing a hair dryer and receptacle member according to the embodiments shown in FIGS. 4 and 5. First and second extendable members 114' and 116' are connected by an intermediate hinged connection 118' and the member 114' is connected to the vertical surface 120 by a hinged base connection 122'. A receptacle member according to either the pedestal support 88 or 100 is mounted to a hinged end connection 124' extending from the member 116' and the hair dryer according to 12' or 12" is likewise mounted to the appropriate pedestal support. As an additional feature of this embodiment, a power cord 126 of the hair dryer is secured to a surface of the members 114' and 116' by clips or the like, is looped at the hinged connection 118' to prevent tangling, and is plugged in at an end 130 to a point along the vertical surface.

Accordingly, the present invention discloses a useful and improved device for providing elevated and universally adjustable support by safely gripping a handle portion of a hair dryer. The device of the present invention may also advantageously be used in a hotel room bathroom in either the wall mount or floor base mount arrangements and such an application is anticipated.

Having described my invention, additional embodiments will become apparent to one skilled in the art to which it pertains without deviating from the scope of the appended claims.

I claim:

1. A device for providing elevated and universally adjustable support of a held hair dryer, the hair dryer having a body with a handle portion and a heated air discharge portion, said device comprising:

an elongated support extending from a support surface and terminating in an elevated end portion;

a receptacle member secured to said elongated support end portion, said receptacle member further including a pedestal support attached to said elevated end portion of said elongated support; and means for mounting the hair dryer by its handle portion to said receptacle member so that the hair dryer is capable of being pivotally adjusted to a plurality of different angled positions, said mounting means further including a substantially spherical shaped cavity formed in an uppermost portion of said pedestal support, a universal ball being attached to and extending from the hair dryer handle, said universal ball being inserted into said substantially spherical shaped cavity and providing a semi-friction adjustable fit to the hair dryer.

2. A device for providing elevated and universally adjustable support of a held hair dryer, the hair dryer having a body with a handle portion and a heated air discharge portion, said device comprising:

and elongated support extending from a support surface and terminating in an elevated end portion, a receptacle member secured to said elongated support end portion, said receptacle member further including a pedestal support attached to said elevated end portion of said elongated support; and means for mounting the hair dryer by its handle portion to said receptacle member so that the hair dryer is capable of being adjusted to a plurality of different angle positions, said mounting means further including a substantially spherical shaped cavity formed in an underside of the hair dryer handle, a universal ball being attached to and extending from said pedestal support said universal ball being inserted to said substantially spherical shaped cavity and providing a semi-friction adjustable fit to the hair dryer.

3. The device according to claim 2, said elongated support further comprising means for repositioning said receptacle member and hair dryer from a first position to a second position.

4. The device according to claim 3, said elongated support further comprising a first elongated portion and a second elongated portion, said repositioning means comprising selective locking means for loosening and retightening a connection between said first and second elongated portions during said repositioning and preventing subsequent inadvertent movement of the hair dryer during use.

5. The device according to claim 4, said elongated support comprises an upwardly extending telescoping assembly with first and second telescoping members supported upon a ground surface by a floor base, said repositioning means comprising a tightening nut insertable through said telescoping members to adjust a vertical displacement between said members.

6. The device according to claim 4, said repositioning means further comprising semi-frictional engaging means between said first elongated portion and said second elongated portion to fixedly readjust a position of the hair dryer.

* * * * *

UNITED STATES PATENT AND TRADEMARK OFFICE
CERTIFICATE OF CORRECTION

PATENT NO. : 5,613,305
DATED : March 25, 1997
INVENTOR(S) : Nancy Narrin

It is certified that error appears in the above-identified patent and that said Letters Patent is hereby corrected as shown below:

Column 1, line 46, delete "laws" and insert --jaws--.

In the Abstract, line 11, delete "bail" and insert --ball--.

Signed and Sealed this

Twenty-fourth Day of November, 1998

Attest:

BRUCE LEHMAN

Attesting Officer

Commissioner of Patents and Trademarks